Oct. 31, 1967     D. A. RICHARDSON     3,350,541
ICING DETECTOR
Filed Jan. 4, 1965     2 Sheets-Sheet 1
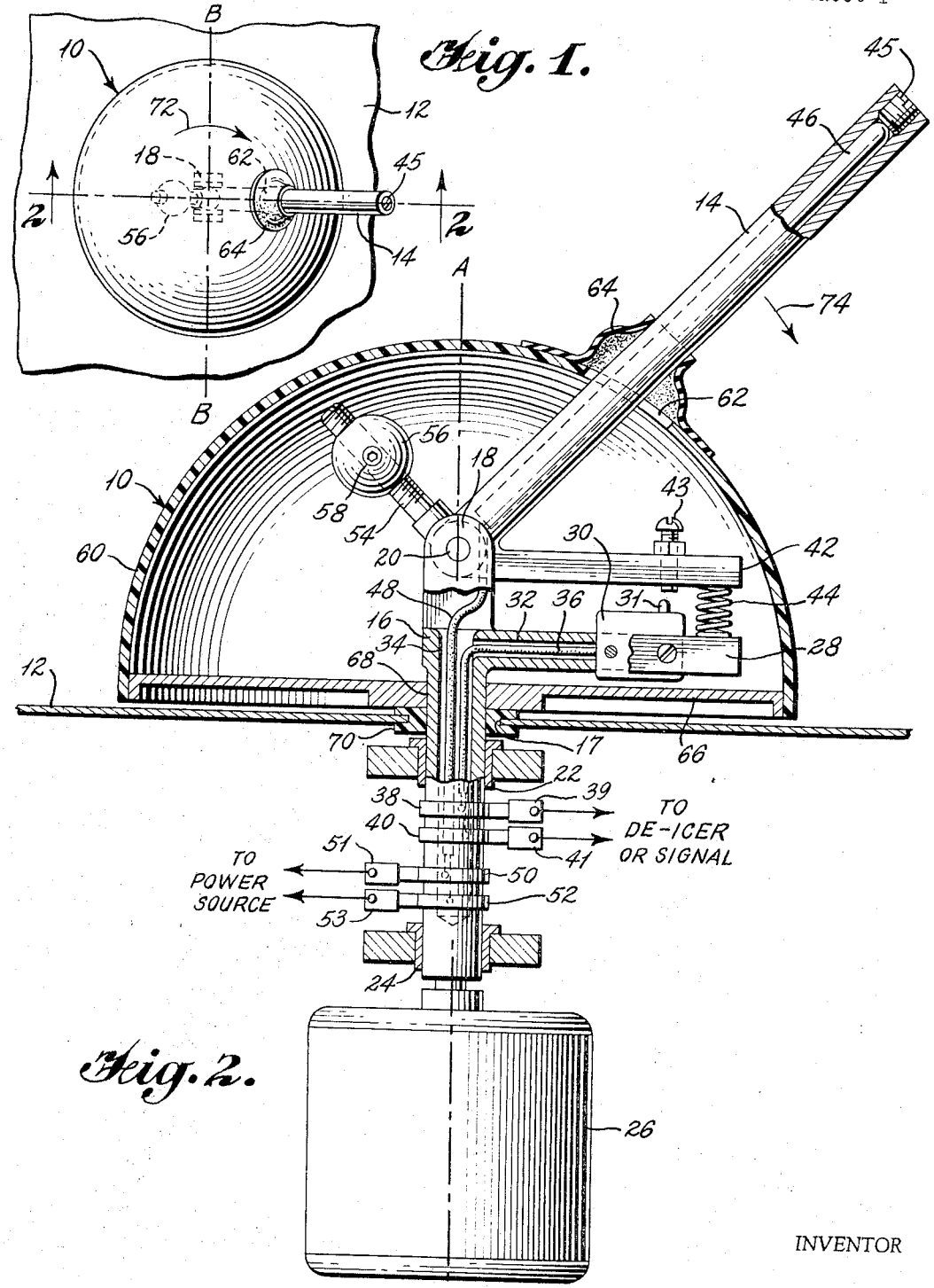
INVENTOR
David Allen Richardson
BY Visek and McDonnell
ATTORNEY

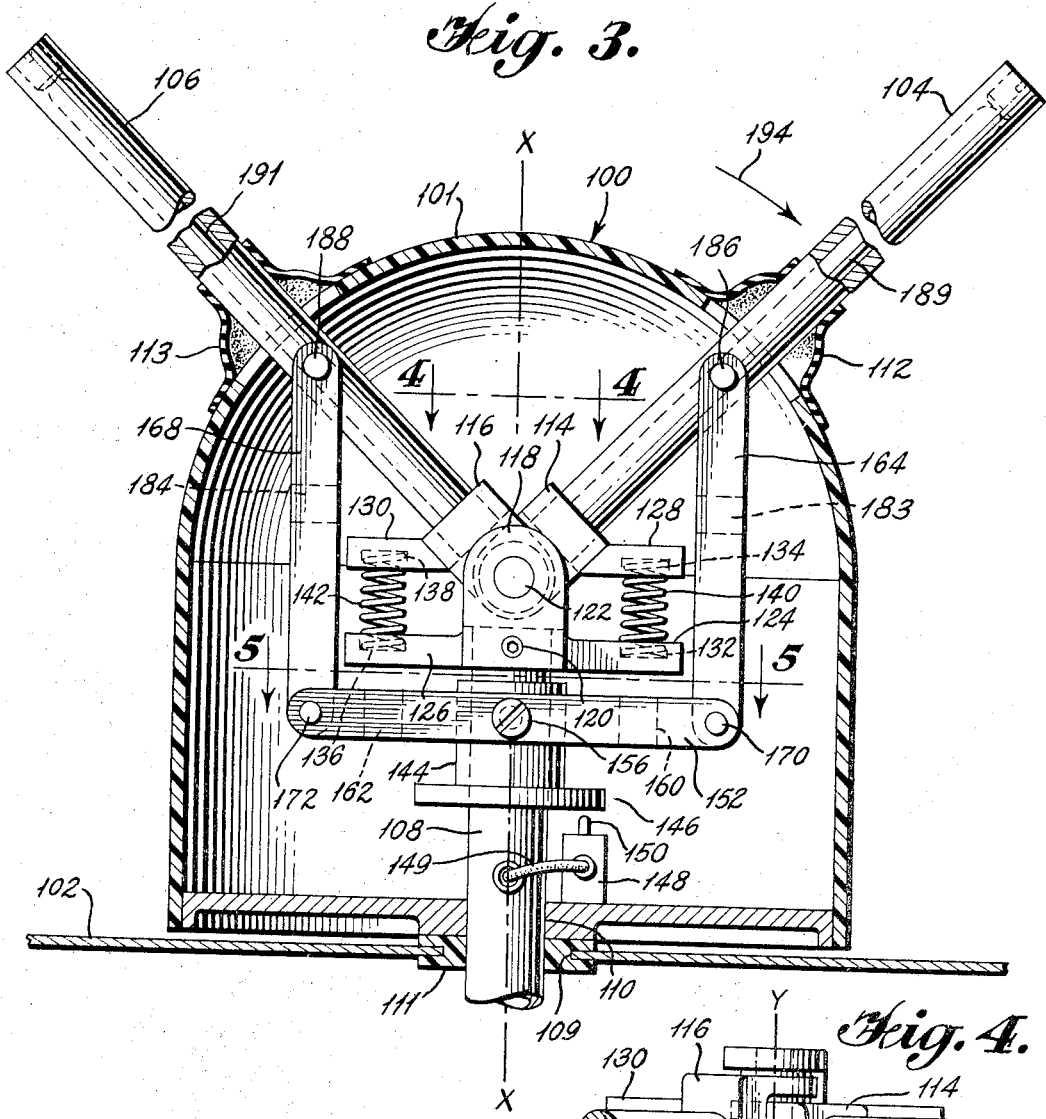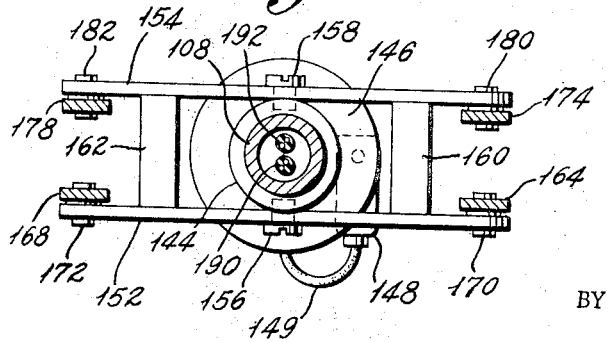

United States Patent Office 3,350,541
Patented Oct. 31, 1967

3,350,541
ICING DETECTOR
David Allen Richardson, Wayne, Pa., assignor to The Boeing Company, Seattle, Wash., a corporation of Delaware
Filed Jan. 4, 1965, Ser. No. 423,127
18 Claims. (Cl. 219—200)

ABSTRACT OF THE DISCLOSURE

An icing detector having a first member adapted to revolve about a first axis and pivot about a second axis, a second member adapted to counterbalance the pivotal movement of the first member, and means adapted to sense an unbalanced pivotal movement of the first member due to the accretion of ice thereon.

---

This invention relates to icing detectors and more particularly to a device for detecting accretion of ice on a surface.

It is well known that the use of various types of equipment under certain conditions of temperature and liquid water content will cause ice to be formed on the equipment. Many systems have been designed to periodically remove accumulations of ice from such equipment. For the most efficient operation of these systems, it is often necessary that an ice detector be incorporated in the system to control the system's cycles.

There are many types of ice detector units presently available. Most of these will detect either an initial film of ice or temperature and liquid water content conditions in which icing may occur. Such devices are ineffective to detect the rate at which ice is accreting on the equipment. This rate is known in the parlance of the trade as the "catch rate." A successful ice rate detector should maintain a certain catch rate regardless of the airflow caused by movement of the object for which ice detection is necessary, and the catch rate of the probe must be integrated with the catch rate of the object for which ice detection is necessary. For given conditions of temperature and liquid content of the air, the catch rate of the sensing device is governed primarily by the velocity of air passed the sensing device and by the shape of the probe of the device. Additionally, most of the presently known units require an external airflow making them unsuitable for use with equipment which is stationary or moves erratically, such as ground radar installations, helicopters, water craft and the like.

The development of "windmill" type detectors has only partially overcome these problems. Any design of the windmill system is necessarily a compromise between a system which is sensitive and a system which is resistant to accidental actuation. Further, since the curvature of the outside surface of the blades is not uniform, the catch rate is affected by the direction of the airflow past the blades. With such a system, a change of the attitude of the object on which the detector is mounted results in a change in the catch rate due to the change of direction of the airflow.

It is therefore a principal object of this invention to provide an improved icing detector.

It is an additional object of this invention to provide an improved icing detector which will accurately detect ice accretion independently of external airflow.

It is a further object of this invention to provide an improved icing detector which is sensitive and resistant to accidental actuation.

It is a further object of this invention to provide an improved icing detector which is stable under conditions of changing velocity of the object on which the detector is mounted.

It is a further object of this invention to provide an improved icing detector which is stable during changing of direction of the object on which the detector is mounted.

It is a still a further object of this invention to provide an improved ice rate meter which will accurately sense the rate of accretion of ice on the object on which the meter is mounted.

Additional objects and advantages will become readily apparent from the following description and drawings.

The invention which accomplishes the above objects and purposes may be described as an icing detector comprising a revolvable member having an exposed surface on which ice may accumulate, a shaft supporting the member for revolution about a first axis, means pivotally connecting the member to the shaft to permit the member to pivot with respect to the shaft about a second axis transverse of said first axis while the member is being revolved, and means for sensing pivotal motion of the member when the accumulation of ice on the exposed surface increases the centrifugal force acting on the member.

The invention which accomplishes the above objects and purposes may also be described as an icing detector comprising a revolvable member, the member having an exposed surface on which ice may accumulate and being asymmetrical about its axis of revolution, so that accumulation of ice on the exposed surface increases the centrifugal force acting on the member and urges the member outwardly away from its axis of revolution, and means for sensing the outward urging of the member.

Preferably the sensing means is comprised of a switch, actuating means connected to the revolvable member for actuating the switch when the accumulation of ice on the exposed surface causes the member to move outwardly with respect to its axis of revolution and means for biasing the member against such outward motion. The actuating means may be adjustable to allow selected increments of ice to accrete on the exposed surface before the switch is actuated.

In the preferred embodiment of this invention, the exposed surface of the revolvable member is shaped to accumulate ice at the same rate independent of the direction of airflow. If the revolvable member is cylindrical in shape as opposed to the shape of an air foil such as a propeller blade, ice will accrete at the same rate independent of the direction of airflow since the curvature of the external surface of the cylinder will be the same in all directions. By rotating a cylindrical probe at about an axis transverse to the longitudinal axis of the probe, the cylinder will intercept air containing the liquid water droplets and accrete ice at a predetermined rate. The rate of accretion increases with the increased amounts of liquid water droplets in the air and the increased rotational speed of the probe.

The rotational speed should be selected so that the desired amount of ice will accrete in the desired time period under the conditions of liquid water content and air temperature which are to be measured. This rotational speed should also be sufficient to make the ice accretion rate of the member relatively insensible to changes in relative wind direction and relative wind velocity. The proper selection of the axis of rotation of the cylindric probe with respect to the main direction of airflow over the object on which the detector is to be mounted will reduce the rotational speed required to minimize the effect of changes in velocity of the object on which it is used.

The invention having been generally described, the preferred specific embodiments will be discussed in detail with reference to the accompanying drawings.

FIGURE 1 is a plan view of an icing detector constructed in accordance with the teachings of this invention.

FIGURE 2 is a vertical section taken along line 2—2 of FIGURE 1.

FIGURE 3 is a vertical section of another icing detector constructed in accordance with the teachings of this invention.

FIGURE 4 is a horizontal section taken along line 4—4 of FIGURE 3.

FIGURE 5 is a horizontal section taken along the line 5—5 of FIGURE 3.

A detector, generally 10, is mounted on a surface 12 of the equipment with which it is to be used. A cylindrical rod or probe 14, having an exposed surface on which ice may accumulate is supported on a rotatable shaft 16 extending through an opening 17 in surface 12.

In accordance with this invention means are provided for pivotally connecting rod 14 to shaft 16. As here embodied, the upper end of shaft 16 is bifurcated providing a yoke 18, and a pivot pin 20 extends through openings in each of the sides of yoke 18 and an opening in the lower end of rod 14 to pivotally connect shaft 16 to rod 14.

Yoke 18 and pin 20 form a joint which allows shaft 16 to revolve rod 14 about a first axis A—A passing through shaft 16 while leaving rod 14 free to pivot outwardly with respect to shaft 16 and first axis A—A about a second axis B—B transverse to first A—A axis. Shaft is mounted for rotation in suitable bearing members 22 and 24. In accordance with the invention means may be provided for rotating shaft 16. As here embodied a motor 26 is connected to shaft 16.

According to the invention sensing means are provided to sense movement of rod 14. The present embodiment has an arm 28 mounted on shaft 16 and carries a switch 30 having an actuator button 31. Arm 28 and the lower end of shaft 16 contain passageways 32 and 34 respectively, to allow an electrical conduit 36 to pass from switch 30 to commutators 38 and 40. These commutators are electrically connected, through brushes 39 and 41, either directly to a deicer system or to a signal to tell the operator that icing is occurring. In accordance with the invention, the sensing means may include an actuating means. As here embodied, an actuator arm 42 is rigidly mounted on rod 14 and is positioned adjacent arm 28. An adjustable screw 43 is mounted on arm 42 adjacent switch 30 for engaging button 31. Arms 28 and 42 are biased apart by a spring 44. The spring may also be secured to arms 28 and 42 to limit the movement of the arms away from each other, and thus to hold screw 43 at a desired distance above button 31.

In the preferred embodiments of the invention, a deicing means is used in conjunction with rod 14. As illustrated here rod 14 is hollow and has its outer end closed by a plug 45. A heating element 46 is mounted in rod 14 and is connected through an electrical conduit 48 to commutators 50 and 52 which are connected through brushes 51 and 53 to a power source. The power source may be operated automatically by switch 30 or it may be operated manually by the operator. Other types of deicers may be used in place of the heating element 46. For example, an expandable boot or liquid spray type deicer could be used.

A threaded stud 54 is rigidly connected to the lower end of rod 14 and has an internally threaded weight 56 mounted thereon. The stud extends on the opposite side of shaft 16 from rod 14 and weight 56 acts to balance the rod and actuator arm 42 as they are revolved by shaft 16. Weight 56 is preferably of a heavy material such as lead and has an Allen locking screw 58 for securing the weight at a desired position on stud 54. If desired stud 54 and weight 56 may be eliminated and spring 44 may be relied upon to hold rod 14 in its normal position.

A hemispherical housing 60 surrounds the portions of the detector which project above the surface 12 of the equipment. Rod 14 extends out of housing 60 through a slot 62 which is of sufficient size to allow the rod to pivot without interference. A flexible boot 64 is secured to housing 60 and rod 14 to prevent moisture from entering slot 62. The lower end of housing 60 is comprised of a disc 66 having an opening 68 for allowing shaft 16 to extend therethrough. Disc 66 is rigidly secured to shaft 16 and to housing 60. Thus the rotation of shaft 16 rotates housing 60. A packing 70 is mounted between shaft 16 and opening 17 of surface 12 to prevent moisture from entering the opening.

It will be appreciated that if desired the detector could be mounted within the equipment with only rod 14 projecting above surface 12. This modification would dispense with the need of housing 60.

When the icing detector is in operation, motor 26 rotates shaft 16 which in turn revolves the housing and the elements therein about axis A—A, as indicated by arrow 72 in FIGURE 1. The device may of course revolve either clockwise or counterclockwise. When icing conditions exist, ice accretes on the portion of the surface of rod 14 which extends beyond housing 60. As the ice layer builds up, the weight of the ice in effect increases the weight of the rod. Since the rod is asymmetrical about its axis of revolution, this increased weight of the rod causes the centrifugal force which is acting on the rod to be increased. The increased centrifugal force causes rod 14 and actuator arm 42 to pivot about axis B—B in the direction indicated by arrow 74. This pivotal movement is opposed by the biasing effects of spring 44 and weight 56.

When a predetermined amount of ice has accreted on rod 14, the centrifugal force acting on the rod urges screw 43 into contact with button 31 of switch 30, causing current to pass through an electrical conduit 36, commutators 38 and 40 and brushes 39 and 41 to a deicer for deicing the equipment with which the detector is used or a signal which tells the user to actuate the deicing system. For a given shape of probe the amount of ice which will accrete on the probe under given conditions of temperature and liquid moisture content can be correlated to the amount of ice which will accrete on the equipment with which the detector is used. Thus, by adjusting screw 43, the device can be set to actuate switch 30 when various selected amounts of ice have accreted on the equipment.

In an automatic system, switch 30 is connected directly to the deicer which deices the surface of the equipment. Switch 30 may also be connected to the power source which actuates heater 46 in rod 14. The heating of rod 14 melts the layer of ice closest to the surface of the rod and causes the ice to be shed therefrom. After the ice is removed, spring 44 and weight 56 urge rod 14 back to its normal position.

If desired, the icing detector may simply actuate a signal which is observed by the operator who then manually controls the deicing system and/or the heater 46.

By observing the frequency with which the icing detector actuates the deicer or signal, the equipment operator can monitor the rate of ice accretion. Additionally, since the detector waits until a certain increment of ice has accreted before actuating the deicer or signal, the detector can be readily used with deicing systems which require an increment of ice before the deicer can effectively operate.

Reference will now be made to the embodiment illustrated in FIGURES 3–5. This embodiment has the advantage of being particularly stable when subjected to sudden acceleration forces.

The detector 100 has a housing 101 and is mounted above a surface 102 of the equipment with which it is to be used. A pair of cylindrical rods or probes 104 and 106 are mounted on a rotatable shaft 108. Shaft 108 is adapted to be revolved by a motor (not shown). The shaft extends first through an opening 109 in surface 102 and then through an opening 110 in the base of housing 100. A packing 111 seals opening 110 against seepage of moisture and permits shaft 108 to rotate therein. The upper ends of rods 104 and 106 extend through slots in housing 100. Flexible boots 112 and 113 are secured to housing 101 and to rods 104 and 106 respectively to prevent moisture from entering the slots. Rods 104 and 106 are mounted at their lower ends in yokes 114 and 116 respectively. Shaft 108 has a yoke 118 mounted on its upper end which is held in place by a screw 120. As may be best seen in FIGURE 4, yoke 116 is larger than yoke 114 to allow yoke 114 to fit inside of yoke 116. Yoke 118 in turn is larger than yoke 116 to allow yoke 116 to be mounted within yoke 118. Yokes 114, 116 and 118 have holes in their legs for receiving a pivot pin 122. Thus, pin 122, pivotally mounts rods 104 and 106 to shaft 108.

Yokes 114, 116 and 118 and pin 122 form a joint which allows shaft 108 to revolve rods 104 and 106 about a first axis X—X passing through shaft 108 while leaving rods 104 and 106 free to pivot outwardly with respect to axis X—X about a second axis Y—Y which is transverse to axis X—X and passes longitudinally through pivot pin 122.

In accordance with the present invention, a sensing means is mounted on the detector for sensing movement of rod 104 outwardly of axis X—X. As here embodied, the sensing means is comprised of an actuator means connected to rod 104, a switch responsive to the actuating means to be energized when rod 104 pivots outwardly of axis X—X, and biasing means for biasing rod 104 against such pivotal movement.

The biasing means, as here embodied, may best be seen in FIGURE 3. Yoke 118 has a pair of arms 124 and 126 extending perpendicularly from its lower end. Yoke 114 has an arm 128 extending above and parallel to arm 124. Yoke 116 has an arm 130 extending above and parallel to arm 126. Arm 124 has a spring seat 132 facing and aligned with a spring seat 134 in arm 128. Similarly arm 126 has a spring seat 136 facing and aligned with a spring seat 138 in arm 130. A spring 140 is secured in spring seats 132 and 134 and serves to bias rod 104 against pivotal movement relative to axis X—X. A spring 142 is secured in spring seats 136 and 138 and serves to bias rod 106 against pivotal movement relative to axis X—X.

The actuating means of this embodiment is illustrated in FIGURES 3 and 5. A sleeve 144 is slidably mounted on shaft 108 beneath yoke 118 and has a shoulder 146 formed on its lower end. A pair of spaced parallel horizontal links 152 and 154 are pivotally mounted on sleeve 144 by pivot pins 156 and 158. Links 152 and 154 are connected together by a pair of webs 160 and 162. Vertical links 164 and 168 are pivotally connected to the ends of link 152 by pivot pins 170 and 172 respectively. A second pair of vertical links 174 and 178 are pivotally connected to link 154 by pivot pins 180 and 182. Links 164 and 174 are connected together by web 183 and links 168 and 178 are connected together by web 184. The upper ends of links 164 and 174 are pivotally connected on opposite sides of rod 104 by a pair of pivot pins 186 and the upper ends of links 168 and 178 are pivotally connected on opposite sides of rod 106 by a pair of pivot pins 188.

The switch of this embodiment is also illustrated in FIGURES 3 and 5. A switch 148 is mounted beneath sleeve 144 and is connected to an electrical conduit 149 passing through shaft 108 to a signal and/or means for deicing the equipment with which the detector is being used. Switch 148 has an actuator button 150 aligned with shoulder 146 of sleeve 144. When depressed by contact with shoulder 146, button 150 actuates switch 148.

The invention preferably includes means for deicing rod 104. As here embodied, the deicing means is comprised of a heating element 189 mounted internally of rod 104 and connected by an electrical conduit 190 to a commutator ring and brush arrangement (not shown) on shaft 108 and then to a source of power. This source of power may be controlled through a manual switch but is preferably operated automatically by switch 148.

Rod 106 also has an internal heating element 191. Heating element 191 is connected by an electrical conduit 192 to a commutator ring and brush arrangement (not shown) on shaft 108 and then to a source of power which is continually supplied to the element while the detector is operating.

When this embodiment of the icing detector is in operation, the motor revolves shaft 108, housing 100, and the remaining elements of the detector about axis X—X. Rod 106 is constantly heated by heating element 191 and hence this probe is free of ice at all times during the operation of the detector. When icing conditions exist, ice accretes on that portion of rod 104 extending beyond housing 100. As the ice layer builds up, the weight of the ice in effect increases the weight of rod 104, and the increased weight increases the centrifugal force which is acting on rod 104. This increased centrifugal force in turn tends to cause rod 104 to pivot outwardly of axis X—X about axis Y—Y as indicated by arrow 194. This pivotal motion is opposed by the biasing effect of spring 140 acting on rod 104 through arm 128 and yoke 114. As the centrifugal force acting on rod 104 overcomes the biasing of spring 140, rod 104 moves in the direction indicated by arrow 194. This motion of rod 104 causes links 164 and 174 to move downwardly. The downward movement of links 164 and 174 moves the right ends of links 152 and 154 downwardly.

Since rod 106 has been kept free of ice the biasing of spring 142 holds rod 106 in place. Hence, links 168 and 178 are held relatively stationary while links 152 and 154 pivot downwardly about pins 172 and 182 respectively. This movement of links 152 and 154 slides sleeve 144 downwardly on shaft 108. When a predetermined amount of ice has accreted on rod 104, the centrifugal force causes shoulder 146 of sleeve 144 to depress actuator button 150 of switch 148. The switch then energizes means for deicing the equipment or a signal or both. Additionally, switch 148 preferably energizes heating element 189 which causes the ice to be shed from rod 104. When the ice is shed from rod 104, it is returned to its normal position with respect to axis X—X.

As previously mentioned, for a given shape of probe the amount of ice which will accrete on the probe under given conditions of temperature and liquid moisture content can be correlated to the amount of ice which will accrete on the equipment with which the detector is used. Thus the strength of spring 140 and the spacing between shoulder 146 and actuator button 150 can be selected to cause the switch to be actuated when a predetermined amount of ice has accreted on the equipment.

Rod 106 acts to stabilize the detector against accidental actuation due to the forces caused by changes in acceleration and direction. Such forces which are prevalent in certain uses of icing detectors can cause accidental actuation. Rod 106, which is ideally the same size, shape and weight as rod 104, counters such forces. Thus a force which tends to urge rod 104 away from axis X—X will also tend to urge rod 106 toward axis X—X. A force of this nature may for the purpose of explanation be envisioned as being perpendicular to axis X—X of FIGURE 3. The pivotal motion of rod 106 toward axis X—X is opposed by the biasing effect of spring 142 acting on rod 106 through arm 130 and yoke 116. As the force on rod 106 overcomes the biasing of spring 142, rod 106 pivots toward axis X—X. At the same time, rod 104 will overcome the biasing of spring 140 and pivot outwardly of axis X—X. The movement of rod 106 causes links 168 and 178 to move upwardly. The upward movement of links 168 and 178 pivots the left ends of links 152 and 154 upwardly. The movement of probe 104 causes links 164 and 174 to move downwardly. This movement of links 164 and 174 in turn causes the right end of links 152 and 154 to pivot downwardly. To this point the effect of the forces of acceleration or change in direction acting on rod 104 is the same as the effect of icing acting on rod 104. However, the forces of acceleration or change of direction have also overcome the biasing of spring 142 and are tending to move the left end of links 152 and 154 upwardly. Thus links 152 and 154 simply pivot clockwise about pivot pins 156 and 158 and do not slide sleeve 144 into contact with switch 148.

It will be appreciated that if the acceleration or change of direction forces are from the opposite direction, they will cause rod 104 to move inwardly of axis X—X and rod 106 to move outwardly of axis X—X, thus causing links 170 and 180 to pivot counterclockwise about pivot pins 156 and 158 and still not move sleeve 144 into contact with switch 148.

There have been illustrated and described what are considered to be preferred specific embodiments of the invention. It will be understood, however, that modifications and variations of this invention will become readily apparent to those skilled in the art without departing from the scope of the invention which is defined in the appended claims.

What is claimed is:

1. An icing detector comprising: a revolvable member, said member having an exposed surface on which ice may accumulate and being asymmetrical about its axis of revolution so that accumulation of ice on said exposed surface increases the centrifugal force acting on said member and moves said exposed surface of said member outwardly away from its axis of revolution; and means for sensing the outward movement of said exposed surface of said member.

2. The device of claim 1 wherein said exposed surface is shaped to accumulate ice at the same rate independently of the direction of airflow.

3. The device of claim 1 including means connected to said member for revolving said member.

4. The device of claim 3 wherein said member has deicing means mounted thereon for removing accumulations of ice from said exposed surface.

5. The device of claim 3 wherein said sensing means comprises: a switch; actuating means connected to said member for actuating said switch when the accumulation of ice on said exposed surface causes said exposed surface of said member to move outwardly with respect to said axis; and means for biasing said member against outward movement.

6. The device of claim 5 wherein said actuating means comprises: a sleeve adapted to move into engagement with said switch and linkage means connecting said sleeve to said revolvable member.

7. The device of claim 6 including stabilizing means connected to said actuating means for stabilizing the icing detector against accidental actuation by the forces caused by acceleration or changes in direction of the equipment on which the icing detector is mounted.

8. An icing detector comprising: a revolvable member having an exposed surface on which ice may accumulate; a shaft supporting said member for revolution about a first axis; means pivotally connecting said member to said shaft to permit said member to pivot with respect to said shaft about a second axis transverse of said first axis while said member is being revolved; and means for sensing pivotal motion of said member when the accumulation of ice on said exposed surface increases the centrifugal force acting on said member.

9. The device of claim 8 wherein said exposed surface is shaped to accumulate ice at the same rate independently of the direction of airflow.

10. The device of claim 8 including means connected to said shaft for rotating said shaft.

11. The device of claim 10 wherein said sensing means comprises: a switch; actuating means connected to said member for actuating said switch when the accumulation of ice on said exposed surface causes said member to pivot about said second axis; and means for biasing said member against said pivotal motion.

12. The device of claim 10 wherein said actuating means comprises: a sleeve slidably mounted on said shaft and movable into engagement with said switch, and linkage means connecting said sleeve to said revolvable member.

13. The device of claim 12 including stabilizing means connected to said actuating means for stabilizing the icing detector against accidental actuation by the forces caused by acceleration or changes in direction of the equipment on which the icing detector is mounted.

14. The device of claim 13 wherein said stabilizing means includes a second revolvable member mounted on said shaft for revolution about the first axis and being pivotally connected to said shaft to permit said second revolvable member to pivot with respect to said shaft about the second axis while said second revolvable member is being revolved said second revolvable member being pivotally responsive to changes in acceleration or direction of the equipment on which said icing detector is mounted.

15. A device for detecting the accumulation of ice on equipment comprising: a cylindrical probe having an exposed surface on which ice may accumulate; a rotatable shaft for revolving said probe about a first axis, means connected to said shaft for rotating said shaft at a speed sufficient to make its ice accretion rate relatively insensible to changes in relative wind direction and relative velocity; means pivotally connecting said probe to said shaft to permit said probe to pivot with respect to said shaft about a second axis transverse to said first axis while said probe is being revolved by said shaft; a switch; actuating means connected to said probe and extending to a position adjacent said switch for actuating said switch when the accumulation of ice on said exposed surface causes said probe to pivot; means for normally biasing said actuating means away from said switch; and deicing means operably connected to said probe to deice said probe.

16. The device of claim 15 wherein said actuating means comprises: a sleeve slidably mounted on said shaft and movable into engagement with said switch and linkage means connecting said sleeve to said probe member.

17. The device of claim 16 including stabilizing means connected to said actuating means for stabilizing the device against accidental actuation by the forces caused by acceleration or changes in direction of the equipment on which the device is mounted.

18. The device of claim 17 wherein said stabilizing means includes a cylindrical rod mounted on said shaft for revolution about the first axis and being pivotally connected to said shaft to permit said rod to pivot with respect to said shaft about the second axis while said rod is being revolved and deicing means operably connected to said rod to constantly deice said member.

References Cited
UNITED STATES PATENTS 2,820,958  1/1958  Fraser _____ 244—134 X
3,091,680  5/1963  Adrig _____ 219—200

RICHARD M. WOOD, *Primary Examiner.*

C. L. ALBRITTON, *Assistant Examiner.*